(No Model.) 2 Sheets—Sheet 2.

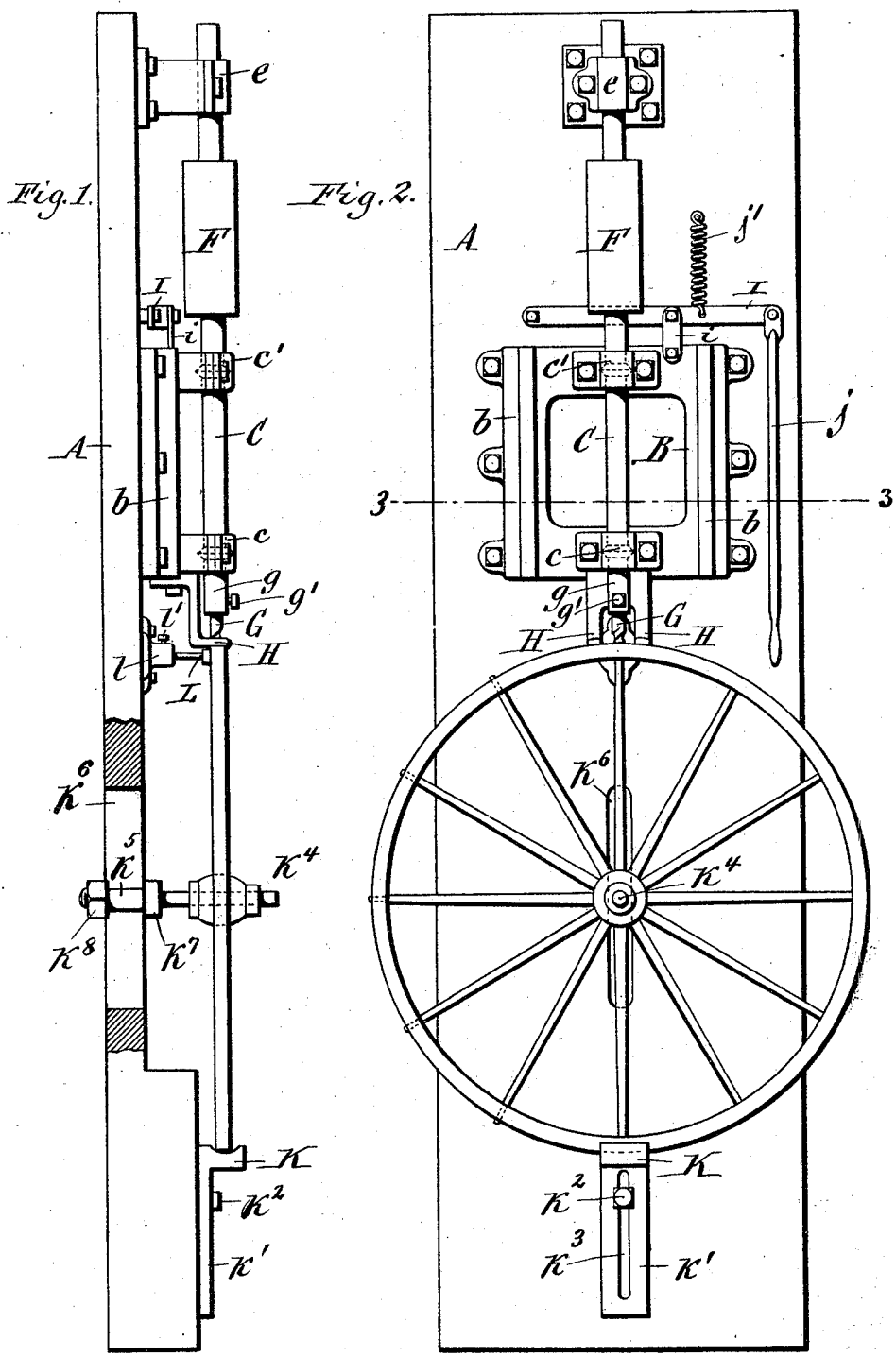

F. G. DAVIS.
SPOKE TRIMMING MACHINE.

No. 561,495. Patented June 2, 1896.

WITNESSES:

INVENTOR.
F. G. Davis
By Wilhelm Bonner
ATTORNEYS.

UNITED STATES PATENT OFFICE.

FRANCIS G. DAVIS, OF WATERTOWN, NEW YORK.

SPOKE-TRIMMING MACHINE.

SPECIFICATION forming part of Letters Patent No. 561,495, dated June 2, 1896.

Application filed March 8, 1894. Serial No. 502,804. (No model.)

*To all whom it may concern:*

Be it known that I, FRANCIS G. DAVIS, a citizen of the United States, residing at Watertown, in the county of Jefferson and State of New York, have invented a new and useful Improvement in Spoke-Trimming Machines, of which the following is a specification.

This invention relates to a machine for pressing wheel-rims upon the spoke-tenons and trimming or cutting off the ends of the tenons preparatory to applying the tire to the rim in manufacturing wooden wheels for carriages and other vehicles.

In a properly-constructed wheel the tenon of the spoke is as long as the rim is deep, so that upon applying the tire the rim bears with its inner side against the shoulder of the tenon and the outer side of the rim and outer end of the tenon are flush, so that the tire bears uniformly against the rim and tenon. In making spokes their tenons are usually made longer than the depth of the rim for which they are intended, and this excess of length of the tenons has heretofore been trimmed off by hand, which operation is laborious and requires considerable care to produce uniform work.

The object of my invention is to produce a simple machine, whereby the rims are pressed down on the spoke-tenons and the ends of the tenons are trimmed accurately and expeditiously.

Figure 3:
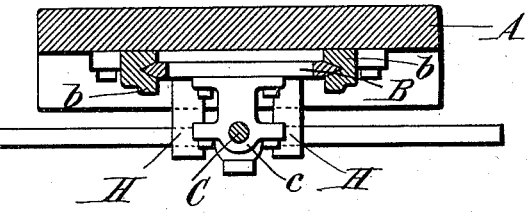
Figure 4:
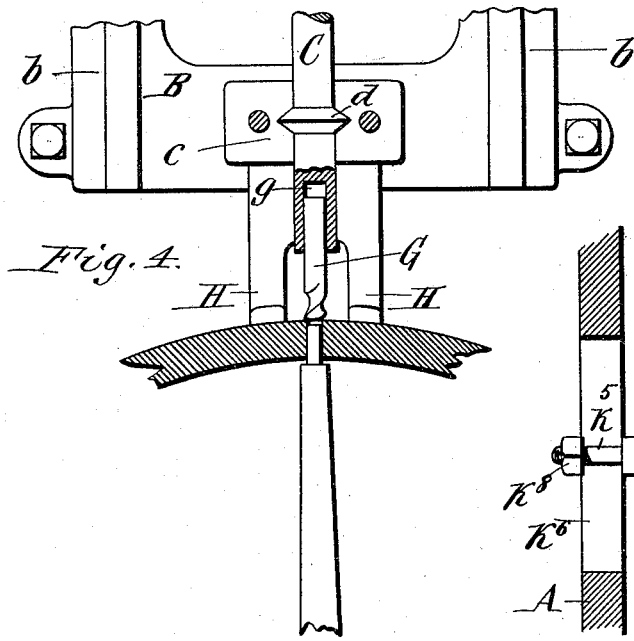
Figure 7:
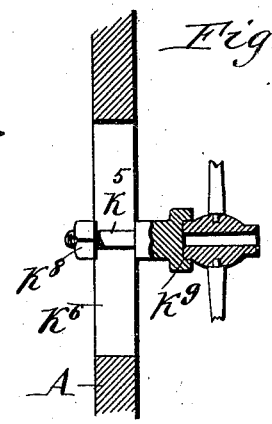
Figure 5:
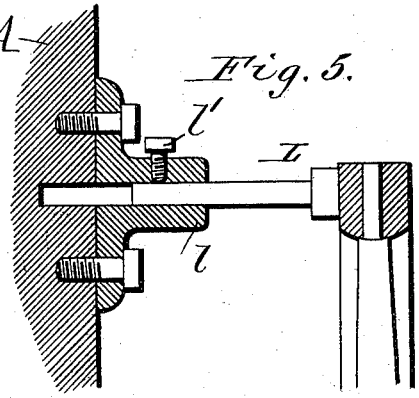
Figure 6:
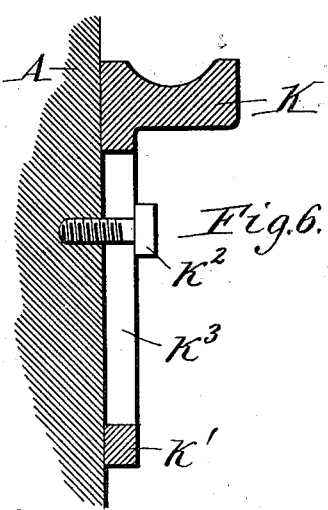

In the accompanying drawings, Figure 1 is a side elevation of my spoke-trimming machine. Fig. 2 is a front elevation thereof. Fig. 3 is a horizontal section in line 3 3, Fig. 2. Fig. 4 is a fragmentary sectional elevation of the cutter, presser-feet, and connecting parts on an enlarged scale. Fig. 5 is a fragmentary vertical section of the steadying device or back-rest on an enlarged scale. Fig. 6 is a fragmentary section of the wheel-rim support on an enlarged scale. Fig. 7 is a fragmentary section showing a modification of the pivotal support for the wheel.

Like letters of reference refer to like parts in the several figures.

A represents the upright standard or frame of the machine, which is secured to a wall or other stationary support.

B represents a vertically-movable slide or carriage, which moves in upright ways $b$, secured to the front side of the frame.

C represents an upright spindle journaled with its lower portion in bearings $c\ c'$, arranged on the slide and moving vertically with the latter. The spindle is held against longitudinal movement in its movable bearings $c\ c'$ preferably by means of knuckles or enlargements $d$, formed on the spindle and seated in correspondingly-shaped sockets formed in the bearings. For the purpose of steadying the spindle it is journaled near its upper end in a stationary bearing $e$, which is secured to the frame and through which the spindle slides in its vertical movements. The spindle is rotated by suitable means, preferably by a belt passing around a pulley F, secured to the spindle between the slide and the upper bearing.

G represents a rotary cutter whereby the end of the spoke-tenon is trimmed or cut off, and which is adjustably secured in a socket $g$ in the lower end of the spindle by a set-screw $g'$.

H H represent feet whereby the rim or felly is pressed down upon the tenon of the spoke and which also serve as a gage for limiting the downward movement of the cutter. These feet are secured to the lower side of the slide and are arranged on opposite sides of the cutter, so as to bear upon the rim on opposite sides of the spoke-tenon.

I represents a lever whereby the slide is depressed and which is connected with the latter by a link $i$ or by other suitable means. This lever is pivoted at one end on the frame and provided at the other end with a handle $j$ for pulling the lever and the slide connected therewith downwardly. The slide is raised into its normal position by suitable means, preferably by a spring $j'$, secured with its ends, respectively, to the frame and the lever.

K represents a block or rest upon which the wheel is supported while its spoke-tenons are being trimmed and which is arranged below the cutter and vertically in line therewith. This block is made vertically adjustable on the frame to suit wheels of different sizes, preferably by an attaching-plate $k'$, which is secured to the frame by means of a bolt $k^2$, passing through a vertical slot $k^3$ in said plate.

$k^4$ represents a horizontal spindle upon which the wheel is turned for presenting the spokes successively to the cutter mechanism. This spindle passes through the hub of the wheel and is provided at its rear end with a shank $k^5$, which passes through a vertical slot $k^6$, formed in the standard. The spindle can be adjusted vertically by shifting its shank in said slot to suit the size of the wheel and is held in its adjusted position by a collar $k^7$, formed on the spindle and bearing against the front of the standard, and a screw-nut $k^8$, arranged on the screw-threaded rear end of the shank and bearing against the rear side of the standard.

Instead of pivotally supporting the wheel by a spindle passing through the hub the latter may be seated in a socket $k^9$, formed on the adjustable shank, as shown in Fig. 7.

L represents a horizontal steadying-bar or back-rest against which the upper portion of the rim rests with its rear side for steadying the wheel while its spokes are being trimmed. This bar is arranged in a socket $l$, secured to the frame, and is capable of horizontal adjustment therein by means of a set-screw $l'$, thereby enabling the steadying-bar to be adjusted to wheels having rims of different widths.

The rim is first applied to the tenons of the spokes without attempting to force it down upon the shoulders thereof. The wheel is then placed with its hub on the centering device, with the lower portion of its rim upon the supporting-block and with the upper portion of its rim against the steadying-bar, so that the tenon of the spoke to be operated upon projects upwardly and is axially in line, or nearly so, with the cutter. The slide is now drawn downwardly, so that the cutter trims off the end of the tenon and the feet press the rim down upon the shoulder of the spoke.

The bearing-faces of the feet and the end of the cutter are arranged in line, or nearly so, with reference to each other, so that when the feet have pressed the rim firmly against the shoulder of the spoke the cutter has trimmed off the tenon flush with the outer side of the rim. In most cases the tenon is of such length that the presser-feet bear upon the rim before the cutter reaches the tenon, in which case the cutting operation does not begin until the rim has been pressed upon the tenon sufficiently to project the tenon beyond the outer side of the rim. Occasionally the tenon of the spoke is of such length that the cutter strikes the same before the presser-feet bear upon the rim, in which case the presser-feet do not operate until the cutter has trimmed off the tenon flush with the rim, when the cutting and pressing operation continue together until finished. In either case the cutting of the tenon is not completed until the rim has been pressed down upon the shoulder of the spoke.

I claim as my invention—

1. In a spoke-trimming machine, the combination with a support on which the wheel is placed and on which the wheel can be turned about its axis, of a cutter-carriage arranged above said support and movable toward and from the same, a rotating cutter mounted on said carriage and adapted to cut off the projecting end of the spoke, and a presser-foot rigidly secured to said carriage on the side of the cutter and arranged with its face substantially in line with the face of the cutter, whereby the cutter and the presser-foot in moving downwardly with the carriage, upon striking the wheel-rim, press the latter against the shoulder of the spoke and effect the proper removal of the projecting portion of the tenon, substantially as set forth.

2. In a spoke-trimming machine, the combination with a support on which the wheel is placed and on which the wheel can be turned about its axis, of a stationary main frame provided with vertical guides above said wheel-support, a sliding carriage movable on said guides toward and from the wheel-support and provided with bearings, a vertical spindle mounted in said bearings and held therein against longitudinal movement, a cutter secured to the lower end of said spindle and adapted to cut off the spoke-tenon, and a presser-foot rigidly secured to the lower portion of said sliding carriage with its lower side substantially in line with the face of the cutter, substantially as set forth.

3. In a spoke-trimming machine, the combination with the stationary frame, of a base-support on which the lower portion of the wheel-rim rests, a central support on which the hub portion of the wheel rests, a horizontally-adjustable back-rest bearing against the rear side of the upper portion of the wheel-rim, a cutter-carriage movable toward and from said supports, a rotary cutter adapted to cut off the end of the spoke and mounted on said carriage, and a presser-foot rigidly secured to said carriage with its face substantially in line with the face of the cutter, substantially as set forth.

Witness my hand this 15th day of February, 1894.

FRANCIS G. DAVIS.

Witnesses:
LOUISE SEIPEL,
JOHN E. FOLEY.